United States Patent [19]

Sury et al.

[11] 3,853,942

[45] Dec. 10, 1974

[54] PROCESS FOR THE MANUFACTURE OF CYCLOPROPA-NECARBONITRILE

[75] Inventors: Yel S. Sury, Mobile, Ala.; Henry C. Grace, Jr., Greensboro, N.C.

[73] Assignee: Ciba-Geigy Corporation, Ardsley, N.Y.

[22] Filed: Sept. 13, 1973

[21] Appl. No.: 397,211

[52] U.S. Cl. .............................................. 260/464
[51] Int. Cl. ................... C07c 121/02, C07c 121/46
[58] Field of Search .................................... 260/464

[56] References Cited
OTHER PUBLICATIONS
Cloke, et al., J.A.C.S. 53 (1931), pp. 2791–2792.

Primary Examiner—Joseph P. Brust
Attorney, Agent, or Firm—Harry Falber; Frederick H. Rabin

[57] ABSTRACT

An improved process for the preparation of cyclopropanecarbonitrile which comprises reacting, at elevated temperatures, halobutyronitrile with an alkali alkoxide in an inert solvent and removing the alcohol formed, said cyclopropanecarbonitrile being useful as an intermediate in the preparation of agricultural, pharmaceutical and fine chemicals.

4 Claims, No Drawings

PROCESS FOR THE MANUFACTURE OF CYCLOPROPA-NECARBONITRILE

Cyclopropanecarbonitrile has proven to be a valuable as well as a versatile compound. Its primary function has been a source of the cyclopropyl group in the preparation of agricultural chemicals, such as N-cycloalkyl anilines, whose performance characteristics are substantially improved by the presence thereon of the cyclopropyl group.

Prior art methods for preparing cyclopropanecarbonitrile have involved reacting, at generally high reaction temperatures, a halobutyronitrile with an alkali hydroxide or sodium amide. For example, the use of potassium and sodium hydroxides has been disclosed in Nicolet, et al., Journal of the Americal Chemical Society, 49, 2068 (1927) and Cloke, Journal of the American Chemical Society, 51, 1180 (1929), while the use of sodium amide has been disclosed in Schlatter, Journal of the American Chemical Society, 63, 1734 (1941). However, certain difficulties have been encountered with these procedures. Thus, sub-standard yields of product have generally been recovered, the reaction with the hydroxides generally showing yields of 40-55% while the reaction with the amide showing yields around 60%. Such low yields of product have generally resulted from troublesome side reactions as well as difficult and prolonged distillation operations. In addition, the prior art procedures have not been readily adaptable to commercial scale-up, due, in part, to the difficulty in handling solid potassium hydroxide, to the potentially violent reaction with sodium amide and to the previously noted involved distillation operations. Furthermore, where the potassium hydroxide was slurried in solvent to overcome the handling problems, huge amounts of solvent were required thereby increasing the duration of the distillation operation and potential loss of product.

It is, therefore, the primary object of this invention to provide an improved process for the preparation of cyclopropanecarbonitrile.

It is a further object to prepare the cyclopropanecarbonitrile by means of a process which will ensure formation of the desired product in high yields.

Other objects and advantages of this invention will be readily apparent from the following detailed description thereof.

We have now, surprisingly, discovered that the use of an alkali alkoxide as the cyclization agent in place of the hydroxide or amide coupled with the essentially simultaneous removal of alcohol results in the preparation of cyclopropanecarbonitrile in yields which generally exceed 80%. This increased yield is attributable to the reduction in potential side-reactions and the elimination of prolonged distillation reactions. Furthermore, this procedure is particularly suitable for commercialization inasmuch as difficult handling problems are not presented by the use of the alkoxide nor are involved separation procedures required for removal of solvent and isolation of product.

The novel process of this invention is seen to proceed according to the following equation:

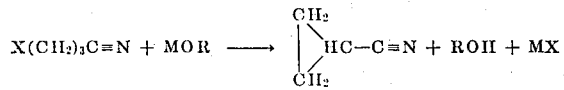

wherein

X is selected from chlorine or bromine;
M is an alkali metal; and
R is an alkyl radical of from one to four carbon atoms.

Thus, 4-chlorobutyronitrile and 4-bromobutyronitrile are applicable for use in the process of this invention. Methods for preparing such nitriles are known, reference in this regard may be made to the JACS articles noted hereinabove. These nitriles are typically prepared by the anhydrous free radical reaction of allyl chloride and hydrogen halide in the presence of benzoyl peroxide, followed by the reaction of the resulting trimethylenechlorohalide, in 50% excess, with sodium cyanide, in ehtanol-water medium, as noted in the following equations:

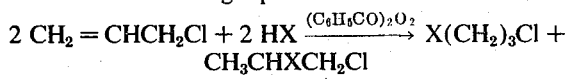

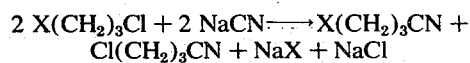

The applicable alkali alkoxides contain from one to four carbon atoms and include sodium methoxide, potassium methoxide, sodium ethoxide, sodium isopropoxide, potassium isopropoxide and sodium t-butoxide. Sodium ethoxide and potassium methoxide are preferred due to their commercial availability. The higher molecular weight alkoxides reduce the chance of alcohol side-esterification inasmuch as they are stronger bases and the alcohols they release are weaker conjugate acids having a lower probability of reaction with the nitriles.

In more detail, the novel process of this invention involves the alkali alkoxide with an inert organic solvent such as benzene, toluene, hexane, heptane, and the like. The temperature of the system is raised to the reflux temperature of the solvent and, while the system is under agitation the halobutyronitrile is slowly added thereto. This addition procedure will generally last from about 1 to 5 hours and the reaction will be allowed to continue for about ½ to 2 hours subsequent to completion of the addition operation.

The alcohol formed in the reaction is removed substantially simultaneously upon formation as the azeotrope with the solvent. Rapid removal of alcohol prevents such side reactions as:

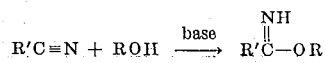

The salt formed during the reaction is removed by filtration or washing with water. The cooled cyclopropanecarbonitrile is then recovered by a convenient distillation procedure. The resulting product is generally a clear liquid having a boiling point of 135°C.

Although the process is described as a batch operation, it may also be conducted on a continuous basis by simultaneous feeding of halobutyronitrile and alkoxide, preferably in the form of a benzene slurry, into the reactor. As an economical feature of the process, the recovered alcohol can be recycled and reacted with alkali metal for conversion into alkoxide.

With respect to proportions, the concentration of halobutyronitrile and alkoxide will generally be determined on the basis of the stoichiometric equivalencies of the reaction, with up to about a 10% molar excess of alkoxide being preferred.

As previously indicated, this process ensures the formation of pure cyclopropanecarbonitrile in high yields. The resulting compound may then be further synthesized into biologically active materials for agricultural and pharmaceutical application. For example, the cyclopropanecarbonitrile may be reacted with n-propylamine in the presence of a platinum metal catalyst to form cyclopropylmethylpropylamine which can then be reacted according to the disclosures of U.S. Pat. No. 3,546,295 to prepare N-cycloalkylaniline herbicidal compounds. Alternately, the cyclopropanecarbonitrile may be converted to cyclopropylamine which may, in turn, be reacted with cyanuric chloride to form cyclopropylamino-substituted-striazine herbicides.

The following examples will further illustrate the embodiment of this invention. In these examples, all parts given are by weight unless otherwise noted.

EXAMPLE I

This example illustrates a method for the preparation of 4-chlorobutyronitrile starting material.

A reactor equipped with means for reflux and vacuum distillation was charged with 844 parts ethanol and 700 parts trimethylene chlorobromide (3.83 moles). The solution was heated to reflux (78°C) whereupon a slurry of 173 parts NaCN (3.03 moles) in 359 parts $H_2O$ was added over a 30 to 45 minute period and the temperature increased to 83°C. Refluxing was continued for an additional 30 minutes. Thereafter, the solvent was distilled to a temperature of 90°C. The solvent and unreacted trimethylene chlorobromide were then vacuum distilled to a temperature of 80°C at 25'' vacuum. The residue was cooled to 50°C and washed with 578 parts $H_2O$ to remove the NaBr formed. The water layer was decanted. The organic layer was then filtered yielding approximately 383 parts of 4-chlorobutyronitrile.

EXAMPLE II

This example illustrates the preparation of cyclopropanecarbonitrile by means of the novel process of this invention.

A flask equipped with means for mechanical agitation was charged with 300 parts of dried benzene and 59.4 parts (1.1 mole) of sodium methoxide. Reflux of the benzene was then initiated through a packed fractionating column. The system was under agitation whereupon 103 parts (1.0 mole) of 4-chlorobutyronitrile was added to the reactor over a five hour period. The methanol formed during the course of the reaction was removed as an azeotrope with benzene (b.p. 58°C). After the 4-chlorobutyronitrile addition was completed, reflux was continued for an additional hour. The reaction mass was then cooled and washed with 225 parts $H_2O$. Upon decanting and distilling the benzene-cyclopropanecarbonitrile product, 52–53 parts of cyclopropanecarbonitrile were recovered indicating a 78–80% yield. The benzene methanol azeotrope was then recycled for reaction with sodium and conversion to the methoxide.

EXAMPLE III

A reaction vessel was charged with 300 parts of dried benzene and 74.8 parts (1.1 mole) sodium ethoxide. Reflux of the benzene was initiated through a packed fractionating column. The system was under agitation whereupon 103 parts (1.0 mole) of 4-chlorobutyronitrile was added to the reactor over a five hour period. The ethanol formed during the course of the reaction was removed as an azeotrope with benzene (b.p. 67.8°C). After the 4-chlorobutyronitrile addition was completed, reflux was continued for an additional hour. The reaction mass was cooled and washed with 225 parts $H_2O$. Decantation and distillation of the benzene-cyclopropanecarbonitrile product yielded 58–59 parts cyclopropanecarbonitrile (87–88% yield).

EXAMPLE IV

A reaction vessel was charged with 300 parts of dried benzene and 77 parts (1.1 mole) potassium methoxide. Reflux of the benzene was initiated through a packed fractionating column. This system was under agitation whereupon 103 parts (1.0 mole) of 4-chlorobutyronitrile was added to the reactor over a five hour period. The methanol formed during the course of the reaction was removed as an azeotrope with benzene (b.p. 58°C). After the 4-chlorobutyronitrile addition was completed, reflux was continued for an additional hour. The reaction mass was cooled and washed with 225 parts $H_2O$. Decantation and distillation of the benzenecyclopropanecarbonitrile product yielded 56–57 parts cyclopropanecarbonitrile (84–85% yield).

EXAMPLE V

A reaction vessel was charged with 300 parts of dried toluene and 81.4 parts (1.1 mole) sodium t-butoxide. Reflux of the toluene (b.p. 110°C) was initiated through a packed fractionating column. The system was under agitation whereupon 103 parts (1.0 mole) of 4-chlorobutyronitrile was added to the reactor over a five hour period. The t-butanol formed during the course of the reaction was removed as an azeotrope with toluene (b.p. 82.2°C). After the 4-chlorobutyronitrile addition was completed, reflux was continued for an additional hour. The reaction mass was cooled and washed with 225 parts $H_2O$. Decantation and distillation of the toluene-cyclopropanecarbonitrile product yielded 54 parts of cyclopropanecarbonitrile (80% yield).

EXAMPLE VI

This example illustrates a prior art process for preparing cyclopropanecarbonitrile and highlights several of the disadvantages inherent therein.

A reactor filled with an agitator and a recycle pump was charged with 300 parts toluene and 232 parts (2.25 moles) of 4-chlorobutyronitrile. Solid potassium hydroxide was then ground with a blender and sieved through a 200 mesh sieve screen. Thereafter 126 parts (2.25 g mole) of the ground potassium hydroxide was charged to the recycling solution. A second reactor was charged with 400 parts toluene. The toluene in the second reactor was then heated to constant reflux. The 4-chlorobutyronitrile-potassium hydroxide-toluene slurry was then slowly charged to the second reactor over a ½ to 1 hour period via a valved connecting line. The total system was then refluxed for an additional ½ hour. The reaction mass was cooled to below 30°C whereupon 450 parts of water, which had been circulated in reactor number one, was charged to reactor number two. The potassium chloride was allowed to dissolve and the resulting water and organic layers were separated. Distillation of the toluene-cyclopropanecarbonitrile mixture yielded 96–98 parts of product (64–65 % yield).

It is thus seen that the prior art process is inferior to the process of this invention both as to the recovered yield of product and to the ease of conducting the reaction.

Summarizing, it is seen that this invention provides a vastly improved process for the preparation of cyclopropanecarbonitrile. Variations may be made in proportions, procedures and materials without departing from the scope of the invention as defined by the following claims.

What is claimed is:

1. In the process of preparing cyclopropanecarbonitrile comprising the steps of reacting, in a dried inert organic solvent at elevated temperatures, 4-halobutyronitrile and a basic cyclization agent, and recovering the cyclopropanecarbonitrile product, the improvement which comprises reacting under refluxing condition 4-chlorobutyronitrile or 4-bromobutyronitrile with an alkali alkoxide in which the alkyl moiety has from 1 to 4 carbon atoms, the molar ratio of the nitrile to the alkoxide ranging from stoichiometric equivalency to about 10% molar excess of alkoxide, to obtain the cyclopropanecarbonitrile product and an alcohol byproduct, and removing the alcohol by-product substantially simultaneously with its formation.

2. The process of claim 1, wherein said alkali alkoxide is selected from the group consisting of sodium and potassium methoxides, ethoxides, isopropoxides and tertiary butoxides.

3. The process of claim 1, wherein the alkali alkoxide is present in a molar excess of about 10% over the 4-halobutyronitrile.

4. The process of claim 3, wherein 4-chlorobutyronitrile is reacted with sodium ethoxide.

* * * * *